(12) United States Patent
Huff et al.

(10) Patent No.: US 10,088,598 B1
(45) Date of Patent: Oct. 2, 2018

(54) INDEX INDICATIVE OF WEATHER IMPACT ON OUTDOOR RUNNING

(71) Applicant: The Weather Channel, LLC, Atlanta, GA (US)

(72) Inventors: Christopher Paul Huff, Roswell, GA (US); Robert John Hedin, Atlanta, GA (US); Curtis Brian Halbrook, Woodstock, GA (US); Joseph Paul Koval, Atlanta, GA (US)

(73) Assignee: TWC Patent Trust LLT, Burlington, VT (US)

( * ) Notice: Subject to any disclaimer, the term of this patent is extended or adjusted under 35 U.S.C. 154(b) by 746 days.

(21) Appl. No.: 14/548,649

(22) Filed: Nov. 20, 2014

Related U.S. Application Data

(60) Provisional application No. 61/906,533, filed on Nov. 20, 2013.

(51) Int. Cl.
*G01W 1/00* (2006.01)

(52) U.S. Cl.
CPC ..................... *G01W 1/00* (2013.01)

(58) Field of Classification Search
CPC ........................................... G01W 1/00
USPC ............................................................. 702/3
See application file for complete search history.

(56) References Cited

U.S. PATENT DOCUMENTS

| | | | | |
|---|---|---|---|---|
| 5,924,486 A * | 7/1999 | Ehlers | .................... | F24F 11/006 165/238 |
| 7,752,106 B1 * | 7/2010 | Corby | .................... | G06Q 40/00 705/35 |
| 8,606,418 B1 * | 12/2013 | Myers | .................... | F03D 7/046 700/287 |
| 2003/0126155 A1 * | 7/2003 | Parker | .................. | G06Q 20/102 |
| 2004/0225556 A1 * | 11/2004 | Willen | .................. | G06Q 10/06 705/7.31 |
| 2008/0188354 A1 * | 8/2008 | Pauws | ................ | A63B 71/0686 482/8 |
| 2009/0224881 A1 * | 9/2009 | Koon | ..................... | G01W 1/02 340/7.48 |
| 2010/0216601 A1 * | 8/2010 | Saalasti | .................. | A61B 5/024 482/8 |
| 2013/0014046 A1 * | 1/2013 | Watts | ...................... | G01W 1/00 715/772 |
| 2014/0099614 A1 * | 4/2014 | Hu | ......................... | G09B 19/00 434/236 |
| 2014/0173443 A1 * | 6/2014 | Hawkins, III | ........ | G06F 9/4445 715/733 |
| 2015/0066683 A1 * | 3/2015 | Azose | ................ | G06Q 30/0631 705/26.7 |
| 2017/0206795 A1 * | 7/2017 | Kaleal, III | ............... | G09B 5/06 |

* cited by examiner

*Primary Examiner* — Caleb Henry

(74) *Attorney, Agent, or Firm* — Meunier Carlin & Curfman LLC

(57) ABSTRACT

Methods for compiling, generating, and using a run weather index and a personalized run weather index which represent the cumulative and weighted effects of weather and environmental conditions on outdoor running for different distance categories. The run weather index and personalized run weather index represent relative environmental and meteorological conditions as they affect run performance. Targeted messages associated with a run weather index may also be delivered based on current and/or forecasted run weather indexes or personalized run weather indexes.

20 Claims, 9 Drawing Sheets

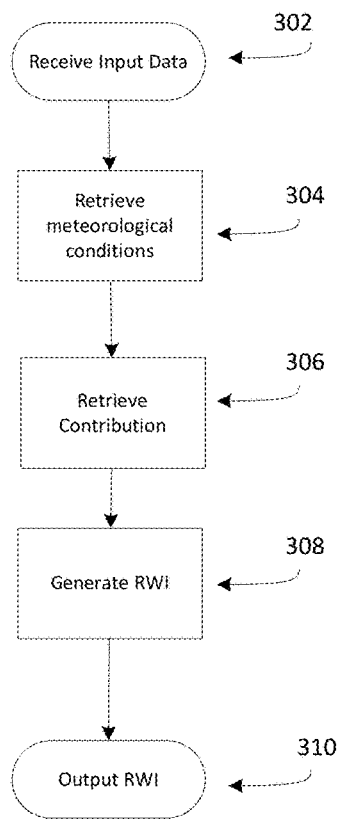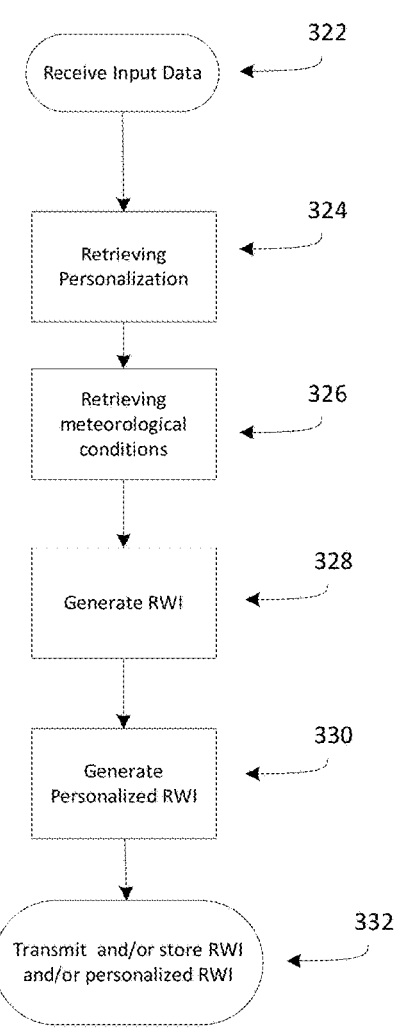
*Fig. 3A*
*Fig. 3B*

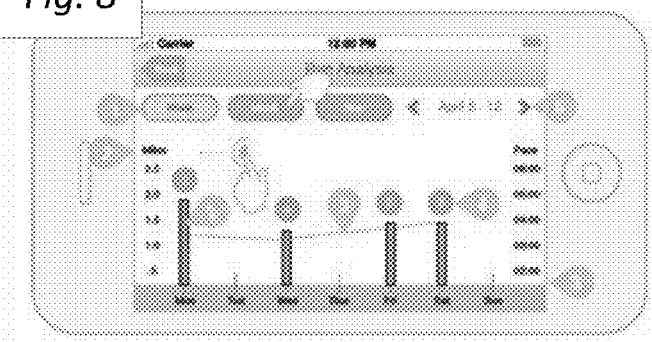
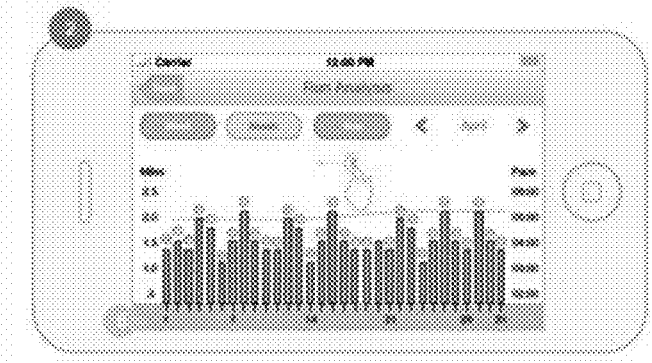
Fig. 8

INDEX INDICATIVE OF WEATHER IMPACT ON OUTDOOR RUNNING

CROSS-REFERENCE TO RELATED APPLICATIONS

This application claims the benefit of priority to U.S. Provisional Application No. 61/906,533 filed Nov. 20, 2013, the disclosure of which is incorporated herein by reference in its entirety.

BACKGROUND

Meteorological conditions often impact a runner's performance. Impacts can range from minor nuisances to major performance challenges and even significant health risks. Weather forecasting and reporting systems currently exist that provide indications of meteorological conditions at a particular time and geographic locations, but those systems do not convey how environmental and meteorological conditions affect the activity of running. Conventionally, running and fitness assistance applications track run performance results but do not track the accompanying weather and environmental factors that can vary a runner's performance. For instance, the NIKE+ RUNNING mobile application tracks run performance and stores local meteorological conditions, but does not use these meteorological conditions to understand the affects of meteorological conditions on running conditions, nor does that application use meteorological conditions to track run performance or aid in improved run planning.

SUMMARY

The following is a summary of the disclosure in order to provide a basic understanding of some of the aspects of the examples presented herein. This summary is not intended to identify key or critical elements of the disclosure or to define the scope of the invention.

Methods of the present disclosure allow for calculating and generating for users a run weather index and a personalized run weather index. Personalized run weather index is based on a user's personal weather preferences. The methods accept inputs where the inputs may be, but are not limited to, a parameter selection, a time selection and a geographic location selection. After obtaining the input, meteorological conditions for that input are retrieved. One way meteorological conditions may be retrieved is by querying a weather database. After the meteorological conditions are retrieved, a run weather index is determined. A run weather index is determined by first, creating contribution index values where the values are indicative of outdoor running conditions, and then combining the contribution index values. Contribution index values may also be dependent on a desired running distance.

In accordance with another aspect of the disclosure, there is provided a method for delivering targeted messages associated with products and services based on a user's run weather index. The method may include generating a run weather index, identifying one or more potential products of interest and delivering the targeted message to the user. Additional features and advantages of the disclosure will be made apparent from the following detailed description of illustrative embodiments that proceed with reference to the accompanying drawings.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

FIGS. 3A-B show example processes for generating a run weather index and a personalized run weather index according to the present disclosure.

FIG. 8 shows an example of a detailed UI for post run analysis; and

In the drawings, like reference symbols indicate like elements.

DETAILED DESCRIPTION

Figure 1:
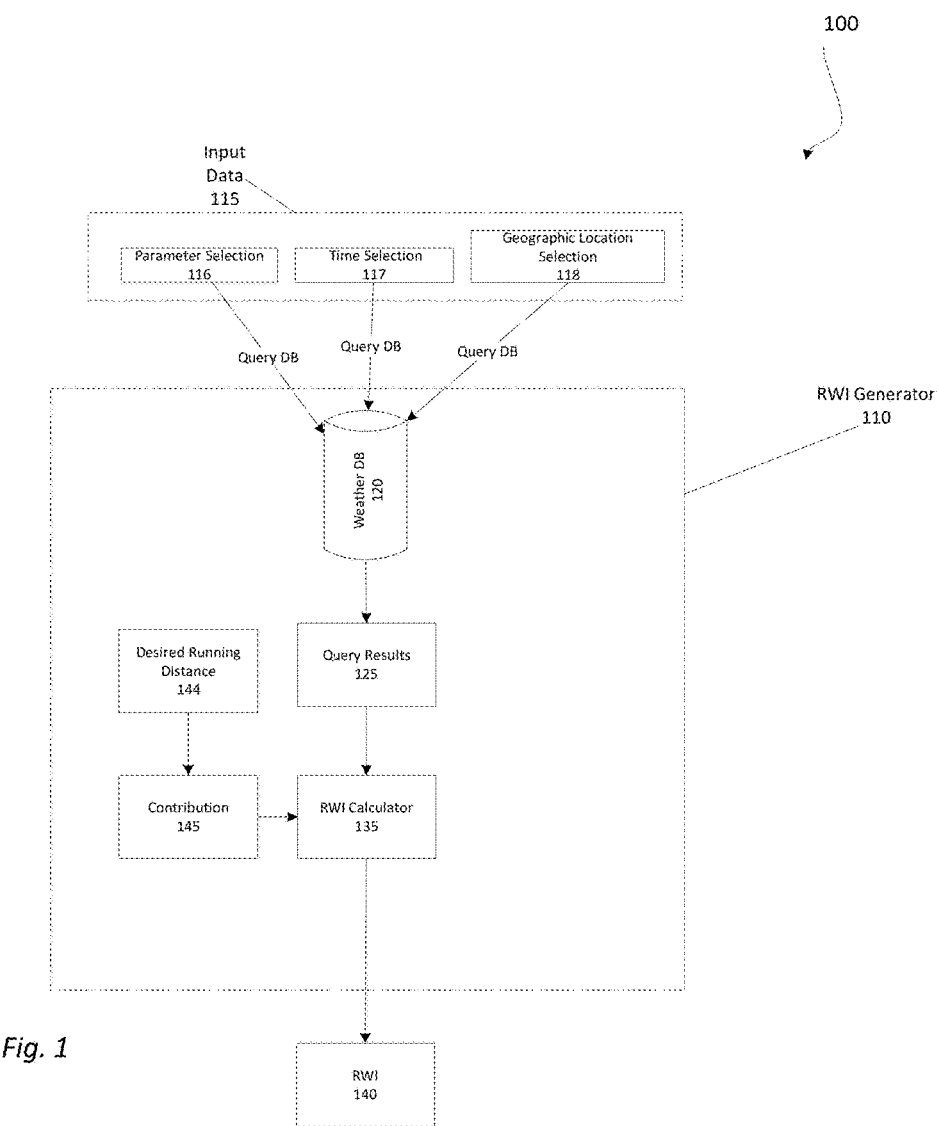
FIG. 1 shows a block diagram of an example environment in which a run weather index may be generated in accordance with the present disclosure.

The following is a description of several illustrations of methods for generating a run weather index (hereinafter "RWI"). Furthermore, the methods can provide targeted messages to individuals/consumers based on the RWI. Certain terminology is used herein for convenience only and is not to be taken as a limitation on the present invention. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms.

Referring now to FIG. 1, there is illustrated an example of a block diagram of an environment 100 for generating RWI 140. As will be described in detail below, the RWI 140 represents the cumulative and weighted effects of weather and environmental conditions on outdoor run performance for different distance categories. Input data 115 sends a request to RWI generator 110 to create the RWI 140 based on the input data 115. For example, input data 115 can include, but is not limited to, the following factors: the parameter selection 116, the time selection 117, and the geographic location selection 118. The parameter selection 116 factors may be one or more meteorological conditions that include but are not limited to: temperature, dew point/humidity, wind speed, cloud cover, moon phase, probability of precipitation, air quality, UV index, visibility, past precipitation or ponding and current conditions. Time selection 117 denotes the instance at which the meteorological conditions of the parameter selection 116 are determined. Time selection 117 may include a past, current or future time. Geographic location selection 118 lists the corresponding location for the desired RWI 140. The geographic location selection 118 may be a city/state combination, a zip code, or can be more specified, for example GPS coordinates or a latitude/longitude/altitude.

In this example, when input data 115 is received, a query may be submitted to a weather database 120 (hereinafter "weather DB"), producing query results 125. As understood by one of ordinary skill in the art, the weather DB 120 is a database that receives observed and forecasted weather data from various sources and stores such data in accordance with time and/or location. The weather DB 120 may be queried to produce query results 125 as a single value or a vector of values corresponding to each parameter selection 116. For example, query results 125 correspond to a meteorological condition from parameter selection 116 at the time selection 117 and the geographic location selection 118 within weather DB 120. For instance, if the parameter selection 116 is temperature, the geographic location selection 118 is zip code 30332 and the time selection 117 is 10/10/2013 at 5 pm EST, query results 125 can be one or more of the following results for the specified time and location: 72° F. which corresponds to the temperature, 50% relative humidity, 30% probability of precipitation, 15 MPH wind speed, 20% cloud cover, and 60° F. dew point. The query results 125 may be used by the RWI generator 110, as described below.

RWI calculator 135 generates RWI 140 by retrieving and combining contribution index value(s) (hereinafter "contribution") 145 for each entry in the query results 125. In accordance with the above, the following RWI relationship may be utilized to generate the RWI:

RWI=[(temperature contribution)+(percent of precipitation contribution)+(dew point contribution)+(wind speed contribution)+(cloud cover contribution)−(Air Quality penalty)]/10.

The RWI may also be a rounded number between the values of 1 and 10. If the RWI is greater than 10, the RWI may be lowered to 10. If the RWI is lower less than 1, the RWI may be increased to 1. It is noted that the RWI 140 is not limited to the above and a linear regression algorithm may be used to provide intermediate values for the contribution 145 tables below by maintaining a correlation coefficient as close to 1 as possible.

As will be described, where each meteorological condition is more favorable for running conditions, the higher its relative contribution 145 to the final RWI 140. For example, Table 1 shows that for temperature, an example contribution 145 is at its maximum when corresponding to a temperature of 70° F.

TABLE 1

| Temperature (° F.) | Contribution |
|---|---|
| 0 | −55 |
| 10 | −45 |
| 20 | −35 |
| 30 | −25 |
| 40 | −15 |
| 50 | 15 |
| 60 | 25 |
| 70 | 35 |
| 80 | 30 |
| 90 | 20 |
| 100 | 0 |
| 110 | −25 |
| 115 | −45 |
| 120 | −55 |

Generally, deviations above or below the contribution 145 maximum will contribute less to the final RWI 140. For example, with temperature, very cold or very hot temperatures can contribute quite negatively to the RWI 140. As seen in Table 2 below as well as in FIG. 1, in accordance with some aspects of the present disclosure, contribution(s) 145 may also depend upon desired running distance 144, for example for distances under six miles, the typical contribution 145 maximum for temperature may occur at 67° F. while for a distance of over six miles, a typical contribution 145 maximum may occur at 57° F.

TABLE 2

| Short Runs | | Long Runs | |
|---|---|---|---|
| Temperature (° F.) | Contribution | Temperature (° F.) | Contribution |
| 0 | −55 | 0 | −55 |
| 10 | −45 | 10 | −45 |
| 20 | −30 | 20 | −20 |
| 30 | −15 | 30 | −10 |
| 40 | −5 | 40 | 15 |
| 50 | 15 | 50 | 27 |
| 60 | 25 | 57 | 35 |
| 67 | 35 | 60 | 32 |
| 70 | 32 | 70 | 30 |
| 80 | 30 | 80 | 25 |
| 90 | 20 | 90 | 10 |
| 100 | 0 | 100 | −10 |
| 110 | −25 | 110 | −35 |
| 115 | −45 | 115 | −50 |
| 120 | −55 | 120 | −55 |

Table 3 shows an example contribution 145 associated with a probability of precipitation (hereinafter "POP") to the RWI 140; the lower the POP the more favorable the running conditions. The contribution 145 here can typically be maximized when the POP is zero; the greater the probability of precipitation, the smaller the contribution 145 to the RWI 140.

TABLE 3

| POP (%) | Contribution |
|---|---|
| 0 | 20 |
| 10 | 19 |
| 20 | 17 |
| 30 | 12 |
| 40 | 5 |
| 50 | 0 |
| 60 | −10 |
| 70 | −25 |
| 80 | −40 |

TABLE 3-continued

| POP (%) | Contribution |
|---|---|
| 90 | −55 |
| 100 | −65 |

However, rain can be a greater detriment than snow to run performance, therefore in this example, contribution 145 may be multiplied by POP factor (see Table 4) to alter the weight of a contribution 145. POP factor is dependent on air temperature. For instance, if the temperature is below 20° F., the corresponding contribution(s) 145 would be multiplied by a POP factor 0.7, while temperatures above 35° F. are given their full weight and therefore the POP factor is 1.

TABLE 4

| Temperature (° F.) | Pop Factor |
|---|---|
| 20 | .7 |
| 30 | .8 |
| 35 | 1 |

Table 5 shows another example contribution 145 associated with dew point. The higher the dew point, the more uncomfortable the air tends to feel and therefore, generates a smaller contribution 145 to RWI 140. Contribution 145 can be typically maximized when the dew point is at 50° F.

TABLE 5

| Dew Point (° F.) | Contribution |
|---|---|
| 50 | 20 |
| 55 | 19 |
| 60 | 10 |
| 65 | 5 |
| 70 | 0 |
| 75 | −20 |
| 80 | −35 |

Furthermore, contributions 145 for dew points above 85° F. may be more heavily weighted.

Tables 6-8 show yet another example contribution 145 for wind speed. At low temperatures, high wind speeds can be fairly detrimental to outdoor activities, while at high temperatures a cool breeze may create more favorable running conditions. Therefore, the contribution 145 in this example is based on both temperature and wind speed. Table 6 shows the wind speed contribution 145 at temperatures below 70° F. Table 7 lists the contribution 145 at temperatures above 70° F. IF the wind speed is >20 mph, make subtractions to the contribution 145 using the subtraction values as seen in Table 8. Therefore, the summation of those elements generates the contribution 145 for the RWI generator 110.

TABLE 6

| Wind Speed (mph) | Contribution |
|---|---|
| 0 | 15 |
| 5 | 12 |
| 10 | 10 |
| 15 | 5 |
| 20 | 0 |

TABLE 7

| Wind Speed (mph) | Addition Values |
|---|---|
| 0 | 5 |
| 5 | 10 |
| 10 | 15 |
| 15 | 10 |
| 20 | 5 |

TABLE 8

| Wind Speed (mph) | Subtraction Values |
|---|---|
| 21 | −6 |
| 25 | −10 |
| 30 | −20 |
| 35 | −35 |
| 40 | −50 |

Another example using a different meteorological condition from parameter selection 116 is cloud cover. Partly cloudy conditions, which relate to a low cloud cover value, create favorable conditions for outdoor activities. On the other hand, overcast skies are typically unfavorable. Yet at temperatures above 90° F., clouds actually help the overall feel of the air, and thus the contribution 145 positively affects the RWI 140. Conversely, a cloud-free sky with very hot temperatures therefore the contribution 145 negatively affects the RWI 140.

A further example contribution 145 may be associated with a moon phase. A moon phase's contribution 145 depends on sunset, sunrise, and moon phase data. This contribution 145 will only add to RWI 140 if both the low temperature forecast is ≥50° F. and if it is for a nighttime forecast. If the forecast period is between four days before and four days after a full moon and is between sunset and sunrise, a cloud cover-dependent number will be added to the RWI 140.

Another meteorological condition from parameter selection 116 can be the air quality. The Air Quality index, as portrayed in the Table 9 below, can be used to adjust the RWI 140 value.

TABLE 9

| Air Quality Index | Contribution | Air Quality Index |
|---|---|---|
| 1 | 0 | Good |
| 2 | 0 | Moderate |
| 3 | −5 | Unhealthy for sensitive groups |
| 4 | −20 | Unhealthy |
| 5 | −30 | Very Unhealthy |
| 6 | −50 | Hazardous |

Thus, the description above provides detailed examples of various contributions 145 of meteorological conditions to the RWI 140. With that understanding, it is noted that the relative contributions 145 may be adjusted to "tune" the RWI 140 for particular locations, individuals or other specified uses.

With the above weather condition contributions, below are example RWIs:

Example 1 (Short Runs)

Dew Point=60 degrees
Temp=80 degrees
Probability of Precip=0

Wind=5 mph
Clouds=20%
AQI=Good
RWI=Round((9+25+17+10+−3+0+0)/10)
RWI=6 for short runs As an explanation, 80 degrees with 50% relative humidity (Dew Point of 60) can be dangerous with prolonged outdoor exertion for unconditioned athletes. More clouds (reduce sun's impact) and/or higher winds (increase sweat evaporation) could have improved the score.

Example 2 (Long Runs)

Dew Point=60 degrees
Temp=80 degrees
Probability of Precip=0
Wind=5 mph
Clouds=20%
AQI=Good
RWI=Round ((9+20+17+10+−3+0+0)/10)
RWI=5 for long runs For long runs, above conditions could be dangerous and at minimum reduce performance so would have a lower RWI.

Figure 2A:
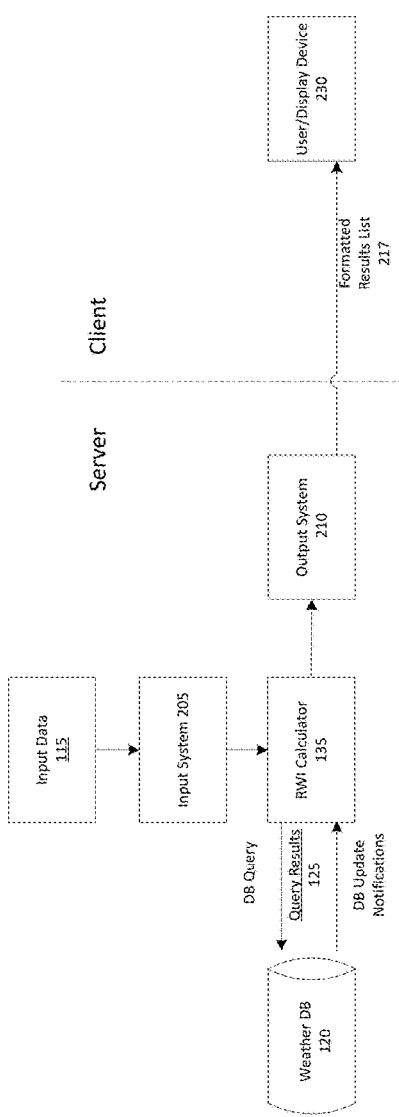
FIG. 2A shows an overview example of an environment in which the run weather index calculator of FIG. 1 is determined server-side.

Referring now to FIG. 2A, an overview example of an environment in which the RWI calculator 135 of FIG. 1 is determined server-side is shown. In this environment, the RWI 140 calculated by the RWI calculator 135 server-side, is transferred through an output system 210 and sent client-side to a user/display device 230. Here parameter selection 116, which is within input data 115, may be input into a forecasting model. Input system 205 can be a front-end system able to receive input data 115 from multiple sources and process the information to RWI calculator 135. For example, the input system 205 may be a process running on a server that receives the input data 115, processes the input data 115 and makes it available to the RWI generator 110 for use as, e.g., query terms provided to the weather DB 120. Output system 210 may include a web server, an application server, a data server, an API client call, or other system that allows access to pushed or pulled data. User/display device 230 is a system that allows the viewing, retrieval, interaction and other similar functions, for formatted results list 217 from the output system 210. For example, the user/display device 230 may be, but is not limited to, a desktop computer, notebook computer, tablet device, mobile device, smartphone, PDA device, etc (see FIG. 9). The formatted results list 217 includes a transmission of data which may include the RWI 140.

Figure 2B:
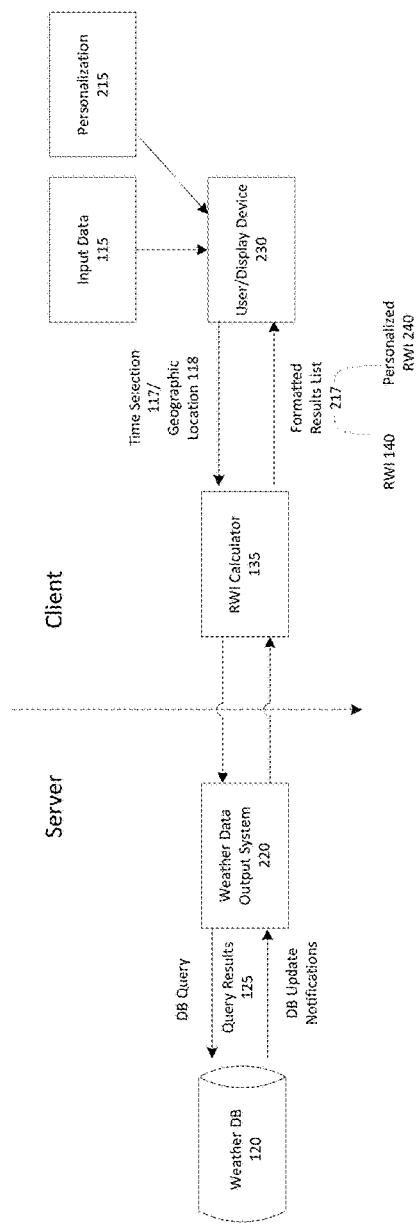
FIG. 2B shows an overview example of an environment in which the run weather index calculator of FIG. 1 is determined client-side.

Referring now to FIG. 2B, an overview example of an environment in which the RWI calculator 135 of FIG. 1 is utilized client-side is shown. Compared to FIG. 2A, FIG. 2B input data 115 is sent to the user/display device 230 client-side, which allows the user/display device 230 to submit personalization 215 and receive a generated personalized RWI 240 within the formulated results list 217. Personalization 215 allows the user/display device 230 to adjust "Impact Levels" (see FIG. 4A-C), which adjust or modify the relative contribution 145 values for a particular user. The personalization 215 enables a user to calculate the personalized RWI 240. The formatted results list 217 here may include both the RWI 140 as well as the personalized RWI 240 (see FIG. 2B).

Referring to FIG. 3A, there is illustrated an example operational flow 300 generating a RWI 140. At 302, an input data is received. For example, the input data 115 may be a parameter section 116, a time section 117, and a geographic location selection 118 that is received by the RWI generator 110. At 304, meteorological conditions are retrieved based on input data. For example, one way of obtaining meteorological conditions is by querying a weather DB 120, which retrieves the meteorological conditions pertaining to input data 115. The meteorological conditions may be one or more of the conditions identified above. At 306, the contributions of each meteorological condition are retrieved. The contribution 145 may be retrieved by a lookup operation performed against the Table described above. At 308, the RWI is generated. The RWI 140 may be generated from the example RWI relationship described above by retrieving and combining the contribution(s) 145 for each meteorological condition retrieved at 306. At 310, the RWI is output. Thus, the operational flow 300 describes a process by which the RWI 140 may be produced in response to retrieving input data 115 by analyzing the cumulative and weighted effects of weather/environmental conditions to outdoor run performance at different distance categories.

Referring to FIG. 3B, there is another example operational flow 320 that generates an RWI 140 and a personalized RWI 240. At 322, input data is received. The input data 115 may comprise of a parameter section 116, a time section 117, and a geographic location selection 118 that is received by the RWI generator 110. At 324, personalization data is received. As described above, the personalization 215 data may be data that allows the user to adjust "Impact Levels". At 326, meteorological conditions are retrieved based on the input data 115. For example, one way of obtaining meteorological conditions is by querying a weather DB 120, which retrieves the meteorological conditions pertaining to input data 115. The meteorological conditions may be one or more of the conditions identified above. At 328, the RWI is generated. The RWI 140 may be generated from the example RWI relationship described above by retrieving and combining the contribution(s) 145 for each meteorological condition retrieved at 326. At 330, the personalized RWI is generated. For example, the personalized RWI 340 may be generated by utilizing the personalization 215 data instead of contribution 145 values or as an adjustment to the contribution(s) 145. At 332, the RWI 140 and/or personalized RWI 340 is stored or communicated to the user. Thus, FIG. 3B illustrates an operational flow 320 to generate the personalized RWI in response to retrieving input data 115 and personalization 215 data by analyzing the cumulative and weighted effects of weather/environmental conditions to outdoor run performance at different distance categories and also incorporating subjective personal information that favors certain meteorological elements.

Figure 4:
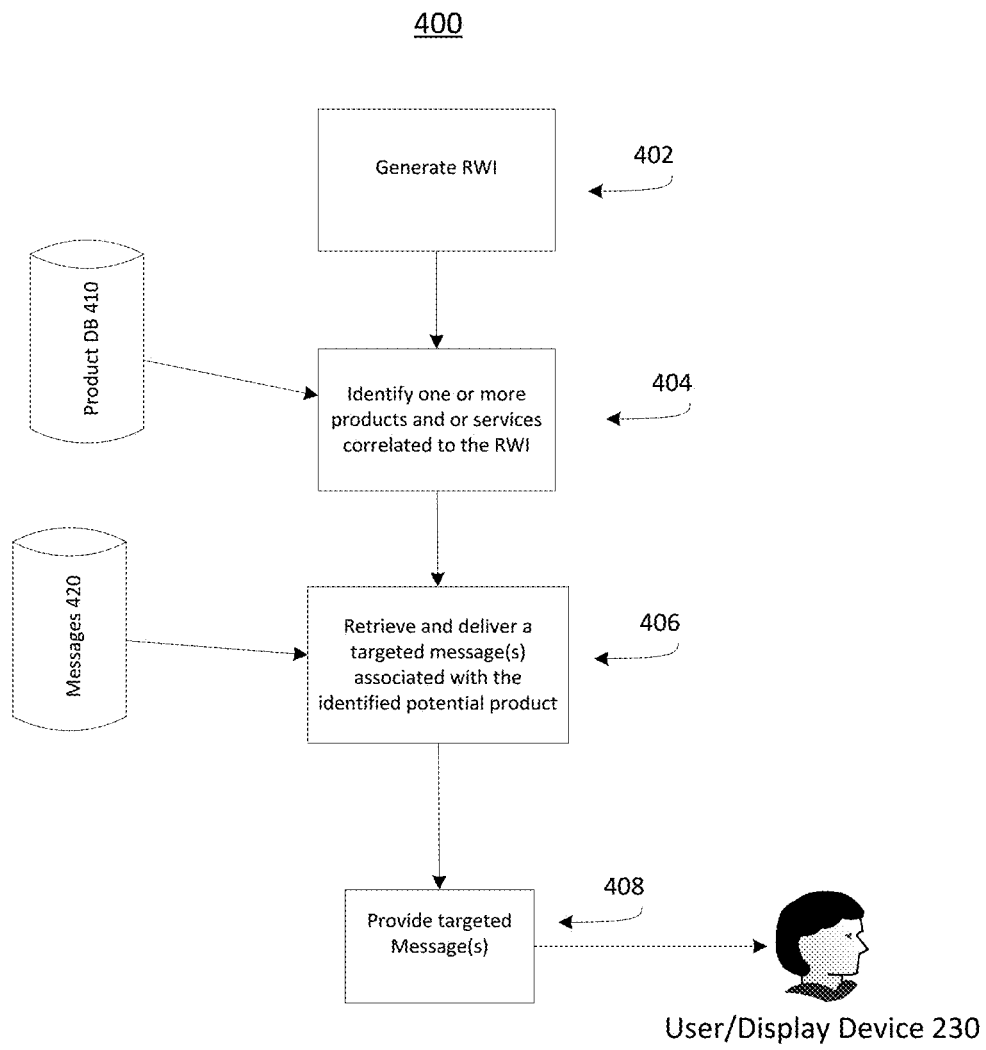
FIG. 4 shows an exemplary process for delivering a targeted message to a user in accordance with the run weather index.
Figure 5:
FIGS. 5A-C show examples of user interfaces (hereinafter "UI") in accordance with the present disclosure.
Figure 6:
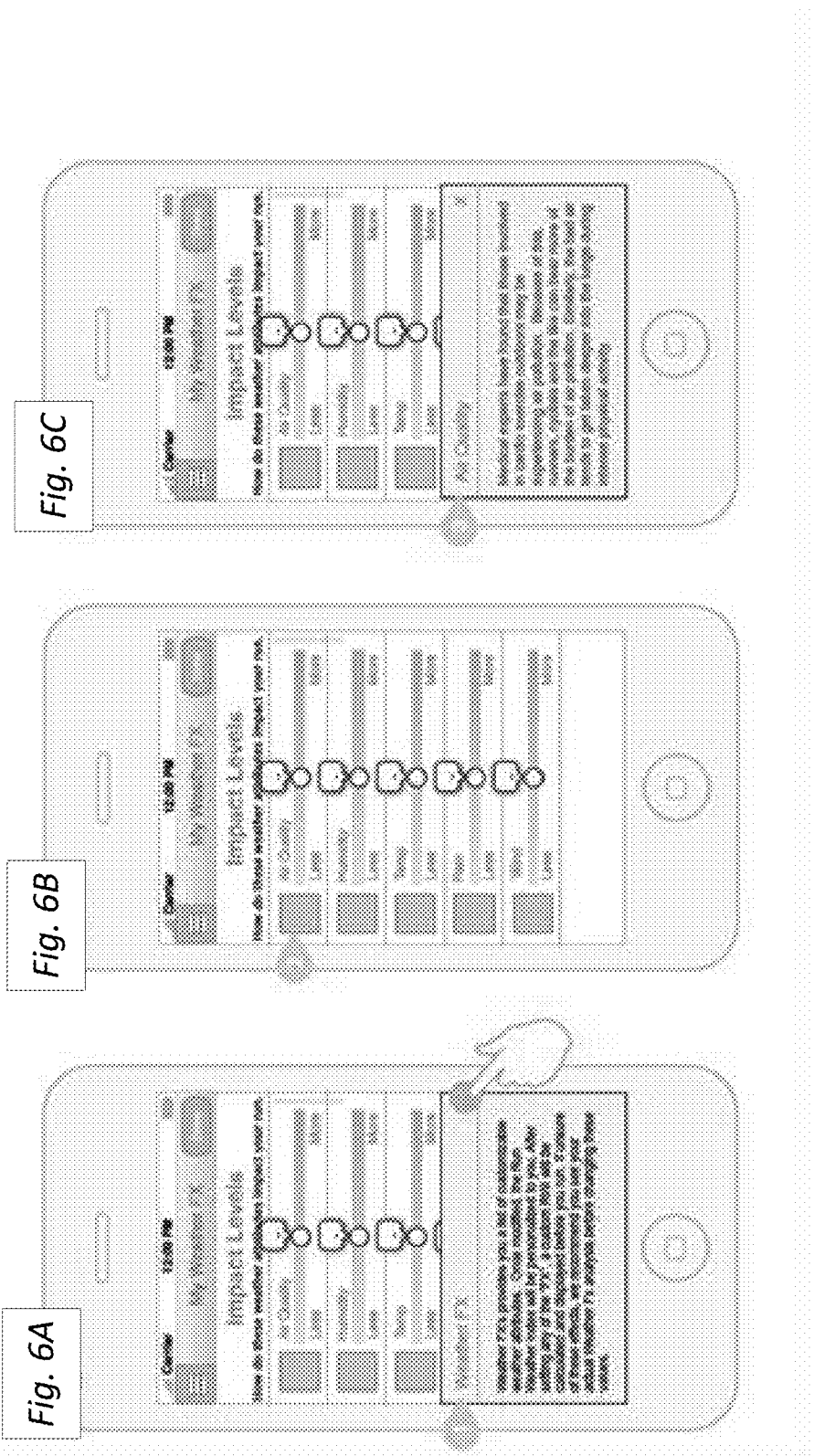
FIGS. 6A-C show examples of a mobile application in accordance with the present disclosure.

Referring to FIG. 4, there is shown an exemplary process 400 for delivering target messages to a user/display device 230 based on RWI 140. At 402, the RWI is generated. The RWI 140 may be generated as described above in FIG. 3A or 3B. At 404, one or more products and or services correlated to the RWI 140, the weather conditionals and geographic information are identified. The list of available advertising products and or services may be found on a product DB 410. At 406, one or more targeted messages are retrieved and delivered for an identified product and or services. For example, gloves and hats may be identified as potential products if the temperature is 40° F. in Atlanta, whereas mid-weight jackets may be identified for the same temperature in Chicago. At 408, a targeted message or messages is provided to the user/display device 230. Thus, the process 400 may be used to deliver targeted messages to a UI associated with the RWI and/or the personalized RWI. Examples of such are shown below.

Referring now to FIGS. 5-8, examples of user interfaces (hereinafter "UI") in accordance with the present disclosure are show. Components of a UI may include, advertising elements, historical running data, RWI 140, personalized RWI 240, personalization 215 in the form of "Impact Levels", future run planning, run analysis and or other functions known to one with ordinary skill in the art.

FIGS. 5A-C show examples of a mobile UI in accordance with the present disclosure. This example UI includes historical running data such as total runs, average pace, calories burned, and total miles this month. FIG. 5A further demonstrates that if location services on the device are disabled, a message will alert and allow the user to enable the services. FIG. 5B shows that by tapping a screen, the RWI 140 causes an animation to spring open showing specific weather elements and specific weather data. FIG. 5C shows how personalization 215 may be implemented by adjusting "Impact Levels".

6A-C show examples of a mobile application in accordance with the present disclosure. FIG. 6A shows a sample display for when a user first accesses the mobile application's screen. FIG. 6B demonstrates that when tapping an icon in the "Impact Levels" screen a user may see a slide panel that provides the user with more contextual information about the parameter selection 116. FIG. 6C demonstrates a slide up menu that may appear from the bottom of the screen to provide contextual information. When tapping outside of that slide menu, this window closes. Alternatively the user may tap the x icon to close the slide menu.

Figure 7:
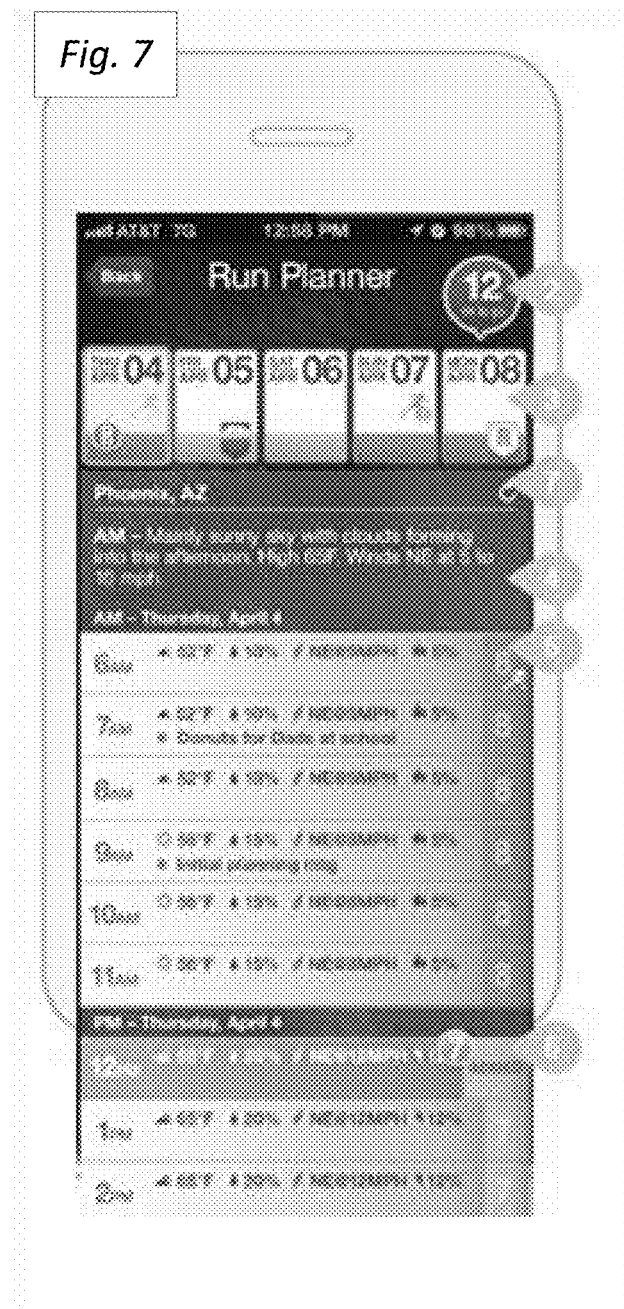
FIG. 7 shows an example of a UI for run planning.

FIG. 7 shows a detailed sample UI for run planning. This display may contain, daily and hourly RWI 140 and or personalized RWI 240 values, textual summary of that day's weather appearance, and or different color schemes representing different RWI 140 values. The personalized RWI 240 may create an updating loop where the personalized RWI 240 and actual performance results are used to adjust future personalized RWI 240 generation.

FIG. 8 shows an example of a detailed UI for post run analysis. FIG. 8 demonstrates a time selector which allows the user to filter the information between weeks, months and years. The UI has a left axis that represents distance, a right access the represents pace and a bottom axis that represents dates. The UI also displays the RWI 140 values corresponding to those previous runs.

Figure 9:
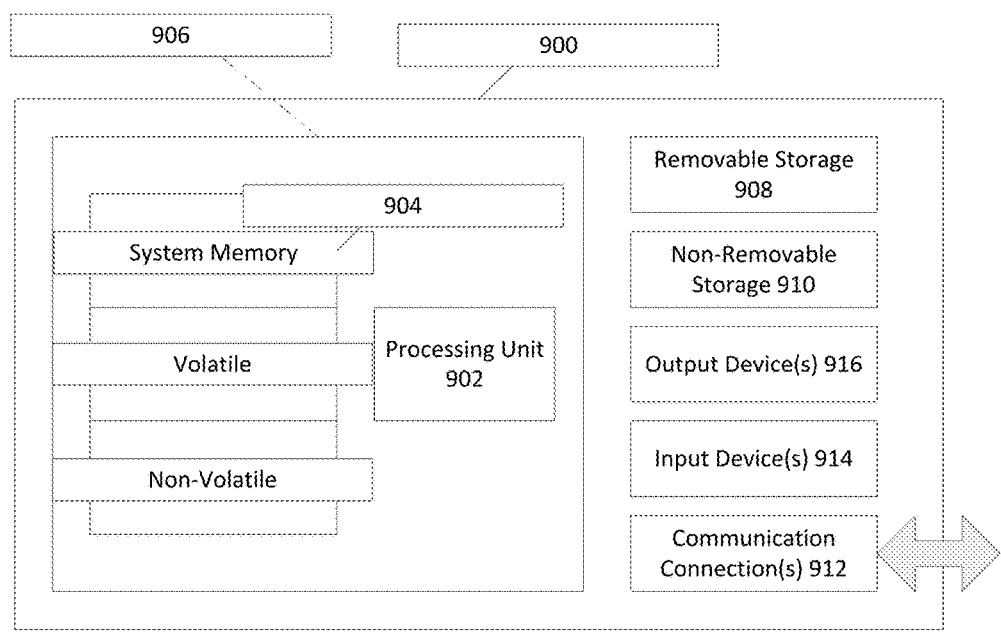
FIG. 9 shows a block diagram of an example of a computing device used in accordance with the present disclosure.

FIG. 9 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that performs particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

An exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by device 900 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a personalized run weather index comprising:
    receiving, by computer-executable instructions of an index calculator executing on a computing device, input data comprising a location;
    retrieving, by the index calculator, meteorological conditions in accordance with said input data by querying a weather database using said input data to obtain a set of query database results containing a corresponding meteorological value for each of said meteorological conditions;
    determining, by the index calculator, a contribution value of each retrieved meteorological value, the contribution value of each retrieved meteorological condition indicative of its relative effect on a fitness running condition, the contribution value of each retrieved meteorological condition is determined based on a look-up operation to a table that correlates a plurality of meteorological values of a corresponding meteorological condition to a plurality of contribution values, respectively;
    receiving, by the index calculator, an adjustment to an impact level of one of the retrieved meteorological conditions so as to adjust a relative effect of the one of the retrieved meteorological conditions on the fitness running condition for a particular user;
    adjusting, by the index calculator, the plurality of contribution values for the table of the one of the retrieved meteorological conditions based on the adjustment to the impact level;
    determining, by the index calculator, a personalized run weather index from a combination of the determined contribution values of the retrieved meteorological conditions, said run weather index indicative of an outdoor fitness running condition and having a value between a predetermined minimum and predetermined maximum; and
    providing, by the index calculator, the run weather index in a format suitable for display in a user interface.

2. The method of claim 1, wherein said input data comprises a parameter selection, a time selection, and a geographic location selection of the location.

3. The method of claim 2, wherein said contribution value of one of the retrieved meteorological conditions is dependent on a desired fitness running distance.

4. The method of claim 3, wherein said desired fitness running distance is either less than a predetermined distance and a first contribution value of the one of the retrieved meteorological conditions is used or greater than the predetermined distance and a second contribution value of the one of the retrieved meteorological conditions is used.

5. The method of claim 1, wherein determining the run weather index includes normalizing the combination of the determined contribution values over the predetermined maximum value of the run weather index.

6. The method of claim 1, wherein the contribution value of one of the retrieved meteorological conditions is determined based on a linear regression of the plurality of contribution values when the corresponding meteorological value contained in the set of query database results is an intermediate value to the plurality of meteorological values in the table.

7. The method of claim 1, wherein the meteorological conditions include one or more of temperature, dew point/humidity, wind speed, cloud cover, moon phase, probability of precipitation, air quality, UV index, visibility, past precipitation, or ponding.

8. The method of claim 1, wherein determining the contribution value of one of the meteorological conditions is dependent upon a meteorological value of another meteorological condition.

9. A method for generating a personalized run weather index comprising:
    receiving, by computer-executable instructions of an index calculator executing on a computing device, input data comprising a location;
    retrieving, by the index calculator, meteorological conditions in accordance with said input data by querying a weather database using said input data to obtain a set of query database results containing a corresponding meteorological value for each of said meteorological conditions;
    retrieving, by the index calculator, personalization data, wherein said personalization data comprises tables that each correlate a plurality of meteorological values of a corresponding one of the meteorological conditions to a plurality of personalized relative contribution index values associated with a user, respectively, each of the personalized relative contribution index values indicative of its relative effect on a fitness running condition for the user;
    determining, by the index calculator, a contribution value for each retrieved meteorological value in the set of query database results based on a look-up operation to the tables;
    combining, by the index calculator, the determined contribution values to produce the personalized run weather index indicative of an outdoor fitness running condition for the user; and
    providing, by the index calculator, the personalized run weather index in a format suitable for display in a user interface.

10. The method of claim 9, wherein said input data comprises a parameter selection, a time selection, and a geographic location selection of the location.

11. The method of claim 10, wherein retrieving said meteorological conditions for said input data, further comprises querying a weather database using said input data to obtain a set of query database results containing said meteorological conditions.

12. The method of claim 10, wherein a relative contribution index value of said relative contribution index values is dependent on a desired fitness running distance.

13. The method of claim 12, wherein said desired running distance is either less than a predetermined distance and a first relative contribution value is used for the relative contribution index value, or greater than the predetermined distance and a second relative contribution value is used for the relative contribution index value.

14. The method of claim 9, wherein determining the personalized run weather index includes normalizing the combination of the relative contribution index values over a predetermined maximum value of the personalized run weather index.

15. The method of claim 9, further comprising:

receiving, by the index calculator, an adjustment to an impact level of a first of the retrieved meteorological conditions so as to adjust a relative effect of the one of the retrieved meteorological conditions on the fitness running condition for the user; and adjusting, by the index calculator, the plurality of personalized contribution values for the table of the first of the retrieved meteorological conditions based on the adjustment to the impact level.

16. The method of claim 9, wherein the contribution value of one of the retrieved meteorological conditions is determined based on a linear regression of the plurality of contribution values when the corresponding meteorological value contained in the set of query database results is an intermediate value to the plurality of meteorological values in the table.

17. A method for providing a target message in accordance with a personalized run weather index comprising:

generating, by computer-executable instructions of an index calculator executing on a computing device, a personalized run weather index that is indicative of the effect of a plurality of weather conditions on outdoor fitness running, wherein generating the run weather index comprises:

receiving, by the index calculator, input data comprising a location;

retrieving, by the index calculator, meteorological conditions in accordance with said input data by querying a weather database using said input data to obtain a set of query database results containing a corresponding meteorological value for each of said meteorological conditions;

determining, by the index calculator, a contribution value of each retrieved meteorological value, the contribution value of each retrieved meteorological condition indicative of its relative effect on a fitness running condition, the contribution value of each retrieved meteorological condition is determined based on a look-up operation to a table that correlates a plurality of meteorological values of a corresponding meteorological condition to a plurality of contribution values, respectively;

receiving, by the index calculator, an adjustment to an impact level of one of the retrieved meteorological conditions so as to adjust a relative effect of the one of the retrieved meteorological conditions on the fitness running condition for a particular user;

adjusting, by the index calculator, the plurality of contribution values for the table of the one of the retrieved meteorological conditions based on the adjustment to the impact level; and combining, by the index calculator, the determined contribution values of the retrieved meteorological conditions to generate the personalized run weather index, said run weather index indicative of an outdoor fitness running condition and having a value between a predetermined minimum and predetermined maximum;

identifying one or more products or services from a list of available advertising products or services in a database based on said personalized run weather index and the weather conditions; and delivering a targeted message associated with said one or more identified products or services to a user device of the particular user.

18. The method of claim 17, further comprising providing the targeted message in a format suitable for display in a user interface.

19. The method of claim 17, wherein determining the personalized run weather index includes normalizing the combination of the determined contribution values over the predetermined maximum value of the run weather index.

20. The method of claim 17, wherein the adjustment to the impact level is based on an adjustment on a user interface to the impact level of the one of the retrieved meteorological conditions.

* * * * *